United States Patent
Peterson et al.

(10) Patent No.: US 10,331,653 B2
(45) Date of Patent: Jun. 25, 2019

(54) DOUBLE-BUFFERED LOCKING IN A DATABASE ARCHITECTURE

(71) Applicant: Invensys Systems, Inc., Foxboro, MA (US)

(72) Inventors: Murray Wayne Peterson, Calgary (CA); Sheila Yvonne Stewart, Calgary (CA); Corvil Burdett Howells, Calgary (CA); Collin Miles Roth, Vancouver (CA)

(73) Assignee: Schneider Electric Software, LLC, Lake Forest, CA (US)

( * ) Notice: Subject to any disclaimer, the term of this patent is extended or adjusted under 35 U.S.C. 154(b) by 345 days.

(21) Appl. No.: 15/193,877

(22) Filed: Jun. 27, 2016

(65) Prior Publication Data

US 2017/0371913 A1 Dec. 28, 2017

(51) Int. Cl.
*G06F 17/00* (2019.01)
*G06F 16/23* (2019.01)

(52) U.S. Cl.
CPC .............................. *G06F 16/2343* (2019.01)

(58) Field of Classification Search
CPC .... G06F 17/30362; G06F 17/00; G06F 17/30; G06F 16/2343; G06F 16/23
USPC .................................................. 707/600–899
See application file for complete search history.

(56) References Cited

U.S. PATENT DOCUMENTS

2005/0055663 A1* 3/2005 Nijdam ................ G06F 9/4484
717/100

* cited by examiner

*Primary Examiner* — Isaac M Woo
(74) *Attorney, Agent, or Firm* — Stinson LLP (57) ABSTRACT

Providing double-buffered record locking in a database architecture. Double-buffered database records enable multiple parallel read locks substantially simultaneously with one write lock to eliminate lock collisions between the read locks and the write lock.

18 Claims, 5 Drawing Sheets

DOUBLE-BUFFERED LOCKING IN A DATABASE ARCHITECTURE

TECHNICAL FIELD

Aspects of the present disclosure generally relate to database architectures that store data values representing aspects of components in industrial processes. More particularly, aspects relate to systems and methods for eliminating collisions between read locks and write locks of the stored data values.

BACKGROUND

Conventional systems and methods require mutual exclusion over data values between reader threads and writer threads, which permits data value access to only one writer thread at a time. During the time that a writer thread has access to the data values, all other reader and writer threads are blocked and must wait for the accessing writer thread to finish its writing operation. When a reader thread is accessing the data values other reader threads may also access the data, but during this time all writer threads are blocked and must wait for the read operations to finish.

SUMMARY

Aspects of the disclosure provide a database segment capable of having multiple read locks and a single write lock asserted thereon substantially simultaneously by real-time processes.

In an aspect, a real-time memory device includes a first field header comprising a first buffer, a second field header comprising a second buffer, and a record header. While in an edit state, the first field header is configured to have data values written to it by a single writer thread. The second field header includes a pointer to a current real-time data value corresponding to a process device within a continuous process. While in an active state, the second field header is configured to have the current real-time data values read from it by reader threads. The record header includes a first field pointer pointing to the first field header, a second field pointer pointing to the second field header, and a currently active pointer pointing to the second field pointer.

In another aspect, a computer-implemented method includes locking a first record header that is in an active state and is part of a database record corresponding to a process device within a continuous process. The method further includes identifying an active record header. The active record header is either the first record header or a second record header being in the active state. The second record header is also part of the database record. The other of the first active record header and the second record header not in the active state is an edit record header. The active record header and the edit record header comprise a double buffer of the database record. The method includes locking the second record header and unlocking the first record header when the second record header is the active record header. Moreover, the method includes reading a pointer value from a data field of the active record header.

In yet another aspect, a method includes obtaining a write lock of a database record corresponding to a process device within a continuous process. The method also includes reading a first pointer to a first field header comprising the database record and a second pointer to a second field header comprising the database record. Moreover, the method includes identifying which of the first pointer and the second pointer is an active pointer and identifying which of the first pointer and the second pointer in an edit pointer. The active pointer points to one of the first field header and the second field header in an active state and the edit pointer points to the other of the first field header and the second field header in an edit state. The method further includes copying data values in fields comprising the active field header into fields comprising the edit field header in response to the edit field header being unlocked and modifying the data values in the fields comprising the edit field header. The modified data values correspond to configuration values of the process device.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
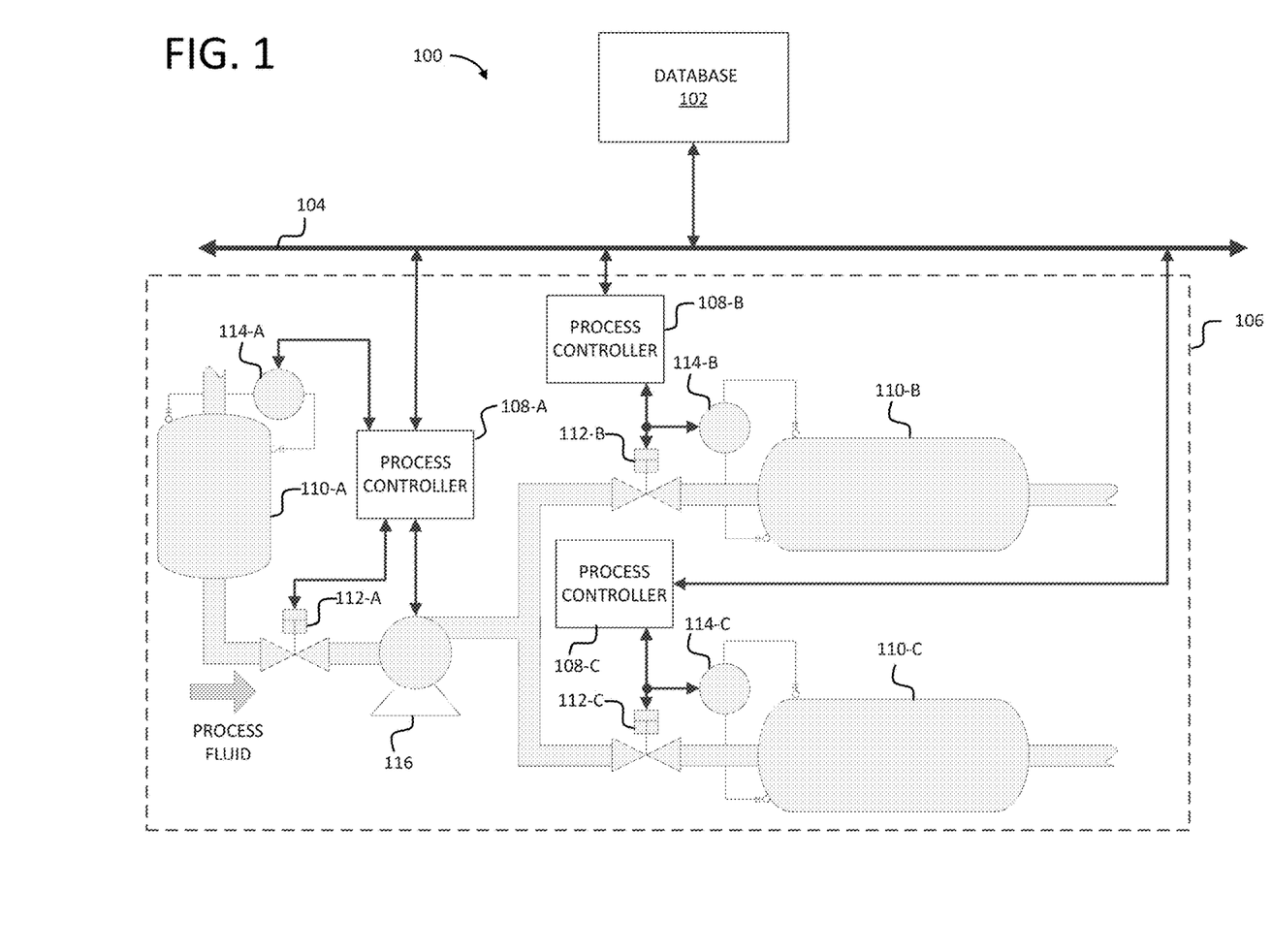
FIG. 1 illustrates an exemplary industrial process system within which aspects of the disclosure may be incorporated.

FIG. 1 illustrates an exemplary system, generally indicated at 100, within which an embodiment of the disclosure may be incorporated. The system 100 includes a database 102, a communications infrastructure 104, and an exemplary plant, such as a fluid processing system 106. As illustrated, the fluid processing system 106 includes process controllers 108, tanks 110, valves 112, sensors 114, and a pump 116. In an embodiment, the database 102, the communications infrastructure 104, the process controllers 108, and the sensors 114 comprise a supervisory control and data acquisition (SCADA) system. In system 100, database 102, process controllers 108, the tanks 110, the valves 112, sensors 114, and the pump 116 are communicatively coupled via communications infrastructure 104.

The database 102 is adapted to provide real-time data values to executing applications that control and/or monitor aspects of fluid processing system 106. In an embodiment, database 102 comprises memory structures on one or more server computing devices. For example, database 102 may utilize shared memory structures that are split into separate real-time and configuration segments (e.g., a segmented database). Co-pending, co-owned U.S. patent application Ser. No. 15/194,038, entitled Transactional Integrity in a Segmented Database Architecture, filed on the same day as this application, discloses a segmented database and is incorporated herein in its entirety by reference. Additional aspects of database 102 are described herein.

The communications infrastructure 104 is capable of facilitating the exchange of data among various components of system 100, including database 102 and components of fluid processing system 106 (e.g., process controllers 108, valves 112, sensors 114, etc.). The communications infrastructure 104 in the embodiment of FIG. 1 includes a local area network (LAN) that is connectable to other telecommunications networks, including other LANs or portions of the Internet or an intranet. The communications infrastructure 104 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 104 is any medium that allows data to be physically transferred through serial or parallel communication channels (e.g., copper wire, optical fiber, computer bus, wireless communication channel, etc.). In an embodiment, communications infrastructure 104 comprises at least in part a process control network. In another embodiment, communications infrastructure 104 comprises at least in part a SCADA system.

Still referring to FIG. 1, the fluid processing system 106 is adapted for changing or refining raw materials to create end products. It will be apparent to one skilled in the art that aspects of the present disclosure are capable of optimizing processes and processing systems other than fluid processing system 106 and that system 106 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, oil and gas pipeline control systems, and/or processes or operations that cannot be interrupted. In an embodiment, process controllers 108 provide an interface or gateway between components of fluid processing system 106 (e.g., valves 112, sensors 114, pump 116) and other components of system 100 (e.g., database 102). In another embodiment, components of fluid processing system 106 communicate directly with database 102 via communications infrastructure 104. In yet another embodiment, process controllers 108 transmit data to and receive data from database 102, valves 112, sensors 114, and/or pump 116 for controlling and/or monitoring various aspects of fluid processing system 106.

The process controllers 108 of FIG. 1 are adapted to control and/or monitor aspects of fluid processing system 106. In an embodiment, processor controllers 108 are programmable logic controllers (PLC) that control and collect data from aspects of fluid processing system 106. In another embodiment, process controllers 108 are adapted to execute real-time applications that read data values from and write data values to database 102, as further described herein.

Figure 2:
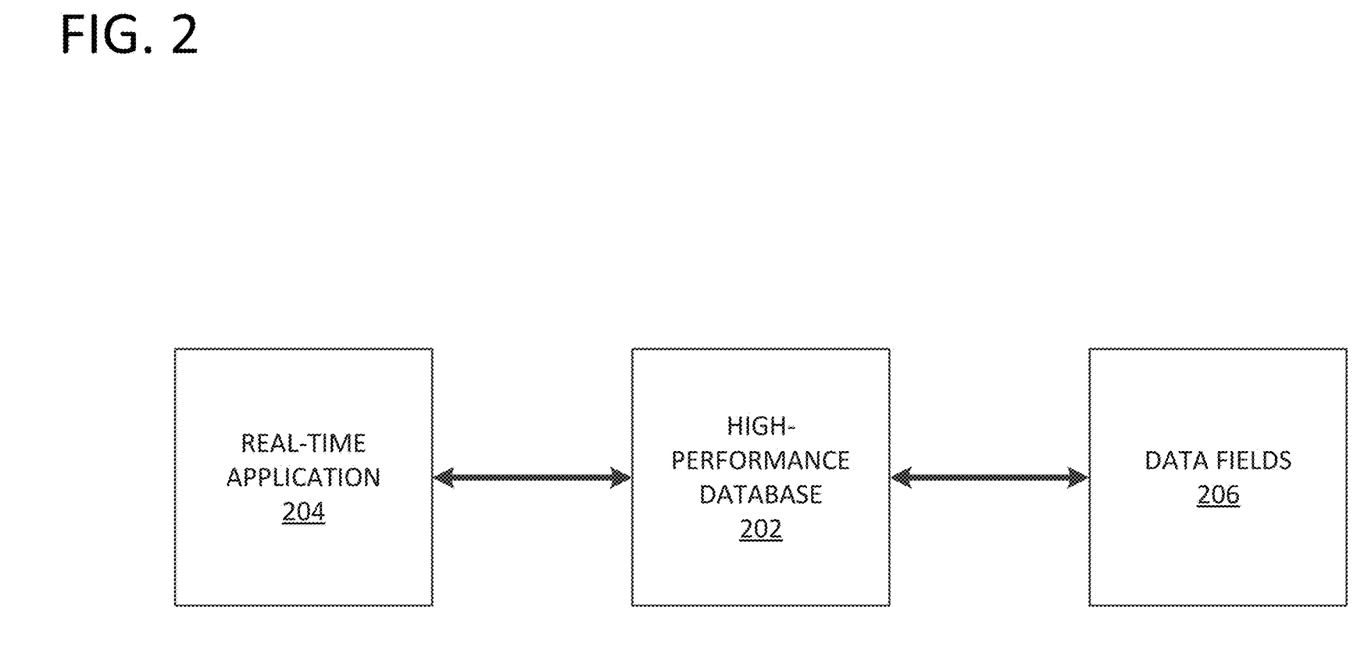
FIG. 2 illustrates an exemplary function block diagram of database segments according to an embodiment.

FIG. 2 illustrates an exemplary function block diagram of database segments of database 102. The illustrated embodiment includes a high performance database (HPDB) 202, a real-time application 204, and data fields 206. The HPDB 202 provides an application programming interface (API) that enables real-time application 204 to access data fields 206, in accordance with an embodiment of the disclosure. Additional aspects of HPDB 202 are described in co-pending, co-owned U.S. patent application Ser. No. 15/194,038, entitled Transactional Integrity in a Segmented Database Architecture, filed on the same day as this application, incorporated by reference above.

Figure 3:
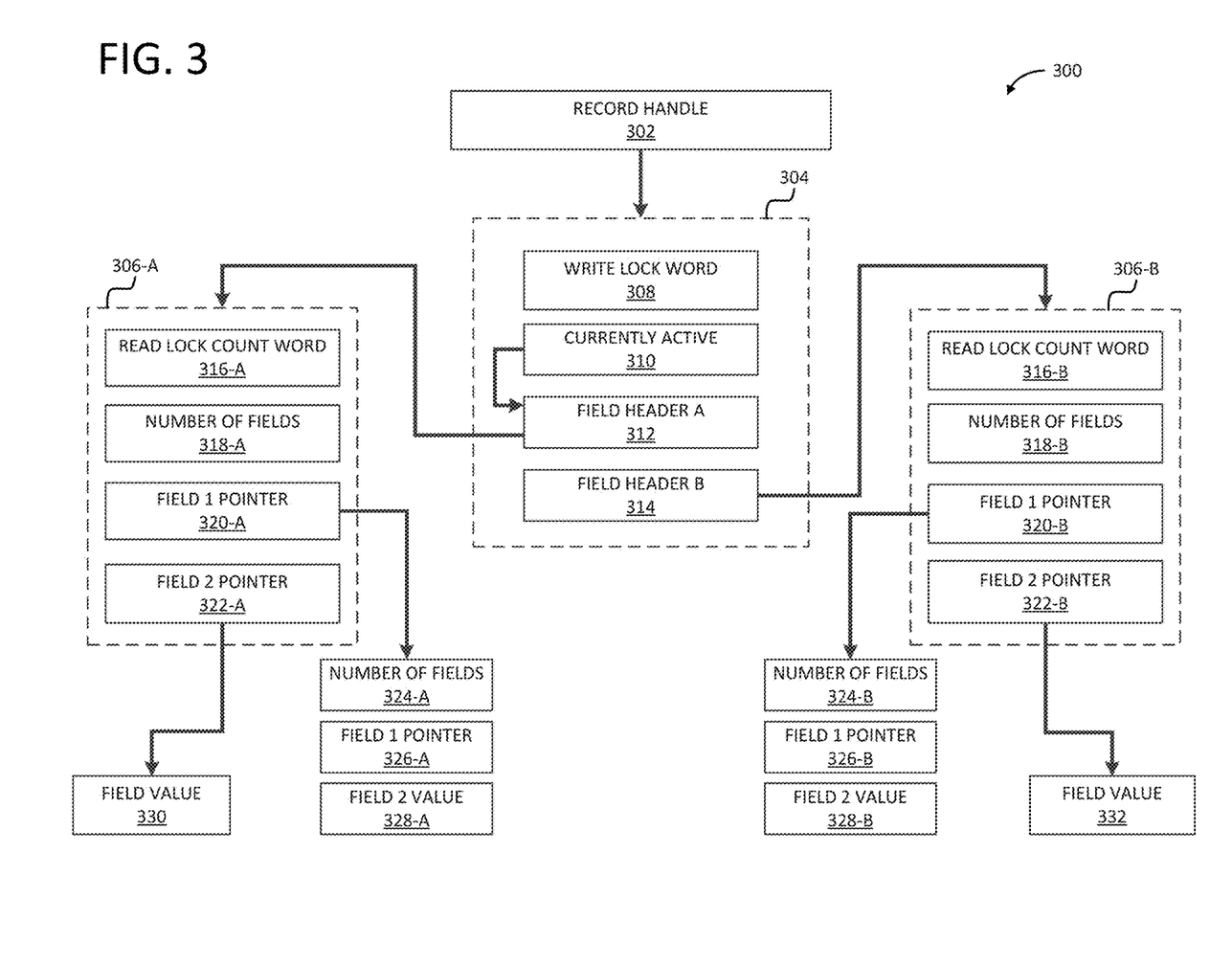
FIG. 3 illustrates an exemplary architecture of active and edit configuration database segments according to an embodiment.

FIG. 3 illustrates an exemplary data record structure 300 stored in database segment 102. The record structure 300 includes a record handle 302, a record header 304, and field headers 306-A and 306-B. The field headers 306-A and 306-B may each be referred to as a buffer in accordance with one or more embodiments of the disclosure. The record header 304 includes a write lock word value 308, a currently active pointer 310, a first field header pointer 312, and a second field header pointer 314. The field header 306-A includes a read lock count word value 316-A, a number of fields value 318-A, a first field pointer 320-A, and a second field pointer 322-A. The field header 306-B includes a read lock count word value 316-B, a number of fields value 318-B, a first field pointer 320-B, and a second field pointer 322-B. In an embodiment, the number of fields value 318-A, the first field pointer 320-A, and the second field pointer 322-A comprise a block of record data and the number of fields value 318-B, the first field pointer 320-B, and the second field pointer 322-B also comprise a block of record data. The content of the blocks of record data may be any data structure representing data including, but not limited to, an array of fields and the like. It will be understood by one skilled in the art that aspects of the disclosure may utilize blocks of record data without regard to the particular format of the record data blocks. The record structure 300 also includes a number of fields values 324-A and 324-B, first field pointers 326-A and 326-B, second field values 328-A and 328-B, an old field value 330 and a new field value 332. In accordance with an aspect of the disclosure, the double-buffering scheme of data record structure 300 removes the need for a single writer thread to block reader threads, or vice versa, with respect to gaining access to the block of record data, whatever its format or structure.

The record handle 302 is a record handle that points to the record header 304. For sake of brevity, the following description refers to field header 306-A as initially being in an active state and configured for transitioning to an edit state and field header 306-B as initially being in the edit state and configured for transitioning to the active state. One having ordinary skill in the art will understand that the roles of field headers 306-A and 306-B may be reversed. In an embodiment, the active state may be referred to as an operational state and the edit state may be referred to as an inactive state. The currently active pointer 310 points to the first field header pointer 312 when field header 306-A is in the active state, as in the embodiment illustrated in FIG. 3. The currently active pointer 310 points to the second field header pointer 314 when field header 306-B corresponds to a configuration database segment in the active state (not shown). The first field header pointer 312 points to field header 306-A and second field header pointer 314 points to field header 306-B.

Figure 4:
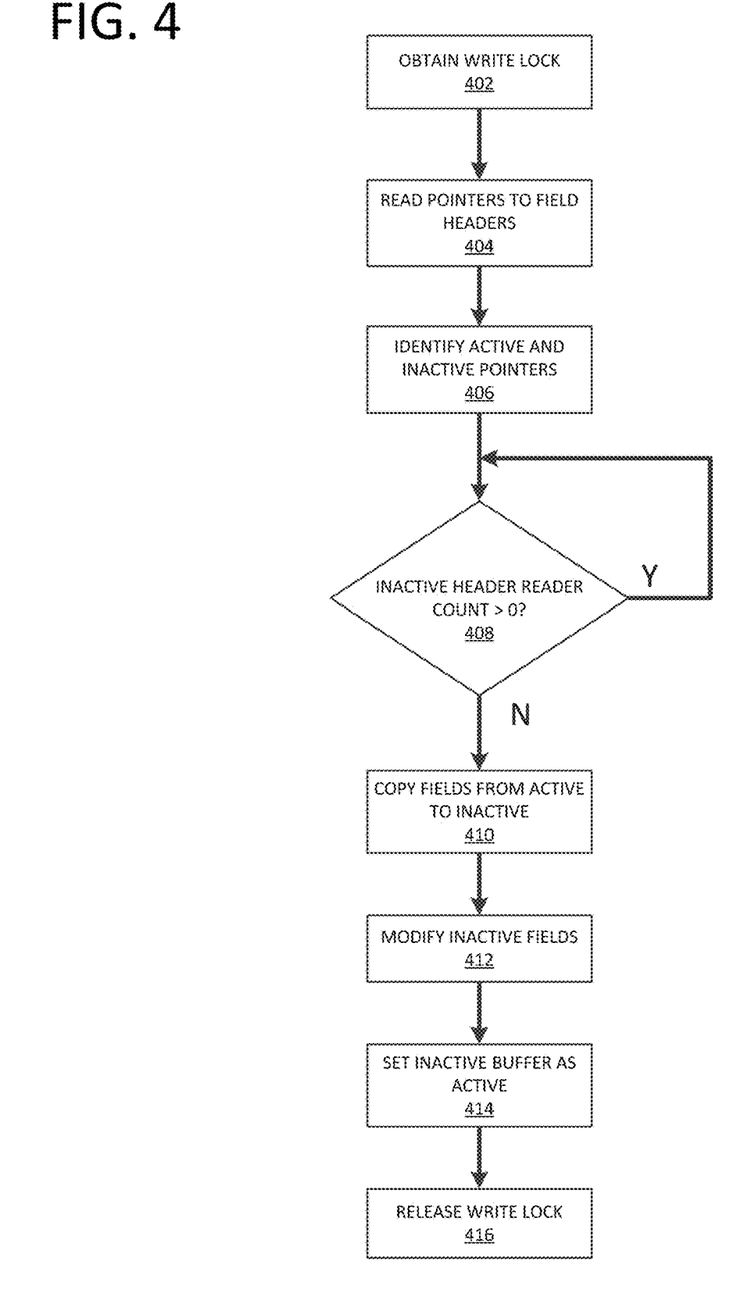
FIG. 4 illustrates an exemplary write locking operation on the database segments of FIG. 3 according to an embodiment.

FIG. 4 illustrates an exemplary write locking operation to prevent simultaneous writing of data fields 206. The HPDB 202 executing a writing operation (e.g., a writer thread) obtains a write lock at step 402. In an embodiment, step 402 comprises the real-time process performing an atomic operation, such as a test-and-set operation, of write lock word value 308. In accordance with an aspect of the disclosure, step 402 is a spinlock, such that the write operation will spin while repeatedly attempting to achieve write lock word value 308, repeating until the lock is achieved. Obtaining the write lock prevents any other writers from obtaining the write lock.

The HPDB 302 reads first field header pointer 312 and second field header pointer 314 at step 404 and identifies, at step 406, which field header pointer 312, 314 points to the field header 306-A, 306-B that is currently active. For example, field header 306-A is active in the embodiment illustrated in FIG. 3 because currently active pointer 310 points to first field header pointer 312.

Referring again to FIG. 4, HPDB 202 determines whether edit field header 306-B is being used by any remaining readers from a previous write operation at step 408. In an embodiment, step 408 comprises HPDB 202 determining whether read lock count word value 316-B for edit field header 306-B is equal to zero. When HPDB 202 determines that edit field header 306-B is no longer being used by any readers, and is therefore unlocked, the process continues to step 410. At step 410, HPDB 202 copies all of the fields from active field header 306-A to edit field header 306-B. For example, field value 330 is written to field value 332. In an embodiment, step 410 may also be referred to as making the edit values identical to the active values. In another embodiment, HPDB 202 only copies the field pointer values themselves (e.g., shallow copying). In yet another embodiment, any field to which values are written must have a copy made of any data pointed to by a handle (e.g., deep copying).

After the completion of step 410, HPDB 202 modifies the fields in edit field header 306-B at step 412. In an embodiment in which shallow copying was performed at step 410, HPDB 202 performs a deep copy of a field before modifying that field as requested by the caller. At step 414, HPDB 202 updates the currently active pointer 310 to point to second field header pointer 314. In an embodiment, HPDB 202 updates (e.g., swaps) headers by atomically writing to currently active pointer 310. After swapping headers, HPDB 202 unlocks the record at step 416. In an embodiment, step 416 comprises HPDB 202 clearing write lock word value 308. After unlocking the record, HPDB 202 returns a success indicia for the unlock call. As explained above, one having ordinary skill in the art will understand that the operation may be reversed when field header 306-B is initially in the active state and field header 306-A is initially in the edit state.

Figure 5:
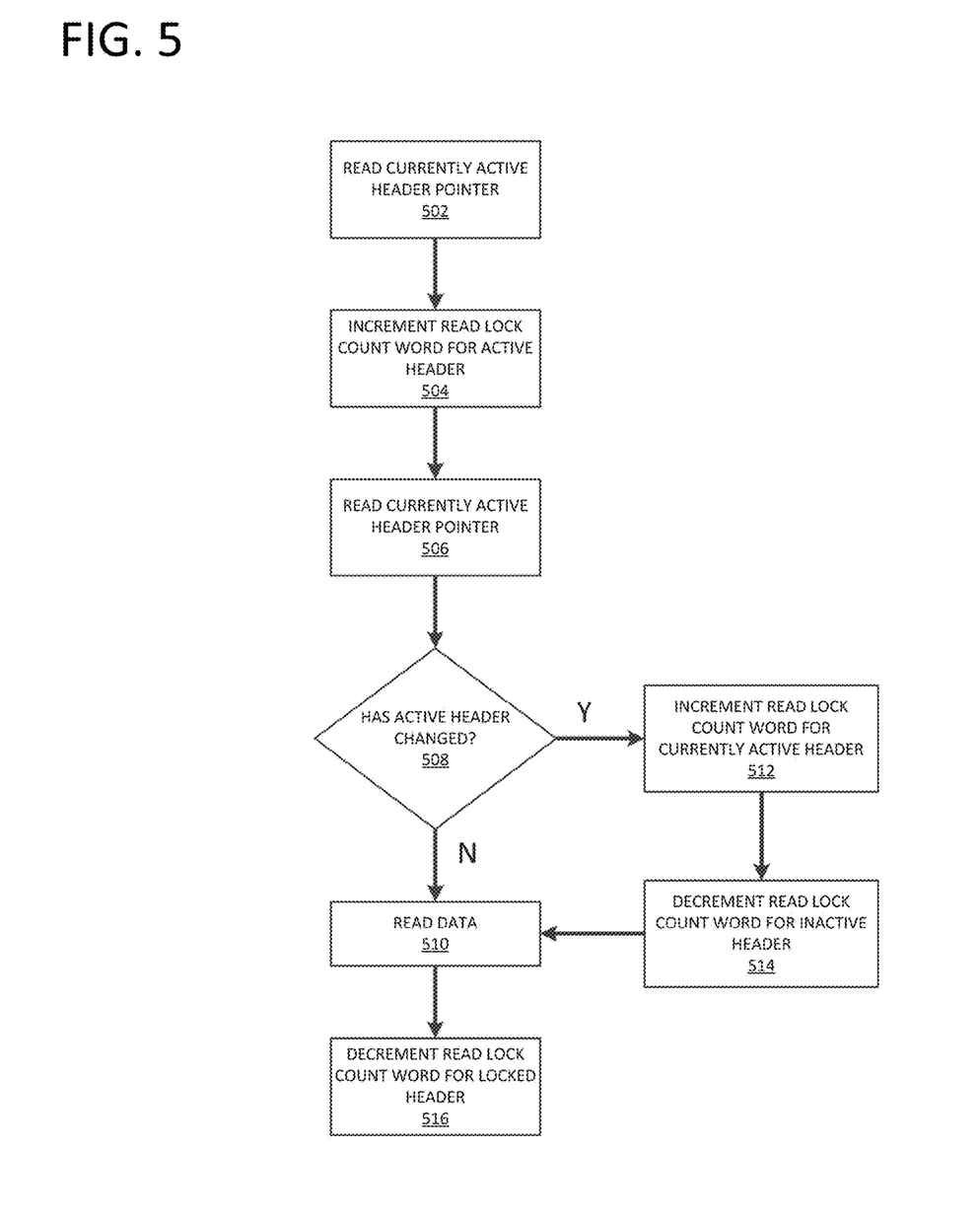
FIG. 5 illustrates an exemplary read locking operation on the database segments of FIG. 3 according to an embodiment.

FIG. 5 illustrates an exemplary operation of obtaining a read lock of data fields 206 without blocking a writer. In an embodiment this operation enables one or more readers and a single writer to simultaneously access one of two buffers. The following describes the exemplary operation in terms of field header 306-A as initially being in the active state and field header 306-B as initially being in the edit state for sake of brevity, but it will be understood by one skilled in the art that the roles may be reversed. According to aspects of the disclosure, HPDB 202 includes associated code (e.g., processor-executable instructions that comprise a program) that implements the exemplary operation illustrated in FIG. 5. Exemplary pseudo-code is included in APPENDIX A.

At step 502, HPDB 202 executing a reading operation (e.g., a reader thread) determines the currently active buffer by reading currently active pointer 310 (FIG. 3). At step 504, the reader locks field header 306-A because it is identified as the currently active header in this example. In an embodiment, step 504 comprises HPDB 202 using an atomic operation to increment read lock count word value 316-A when field header 306-A is the identified active header. Immediately after incrementing read lock count word value 316-A, the reader will re-read the currently active pointer 310 at step 506 and confirm that the currently active buffer has not changed since being evaluated at step 502. For example, if the reader re-reads the currently active pointer 310 and identifies that it now points to second field header pointer 314 then the reader knows that field header 306-B became active since it checked at step 502. When HPDB 202 determines that field header 306-A is still the active header because the value of currently active pointer 310 did not change, the reader thread executing on HPDB 202 can immediately read the data values as shown at step 510. After it is finished reading the data values, the reader decrements read lock count word 316-A to indicate that it is finished with the reading operation.

When HPDB 202 determines, at step 508, that the originally active field header (e.g., field header 306-A in this example) is no longer the active header, it proceeds to step 512. This situation may arise when the currently active header is swapped by a writer at substantially the same moment in time that HPDB 202 is incrementing read lock count word value 316-A. At step 512, HPDB 202 increments the read lock count word for the currently active header (e.g., field header 306-B in this example) such that both field headers 306-A and 306-B temporarily have a read lock. After temporarily locking both field headers, HPDB 202 unlocks the edit field header. As shown at step 514, HPDB 202 decrements the now inactive read lock word value 516-A. The reader executing on HPDB 202 then proceeds to read the data values associated with the now active field header 306-B at step 510. After it is finished reading the data values, the reader decrements read lock count word 316-B to indicate that it is finished with the reading operation.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

APPENDIX A

```
tmpA = pointer to header A
tmpB = pointer to header B
tmpActive = pointer to currently active header
Atomically increment tmpActive->read lock count
// If a writer swapped headers on us, we need to do some more work,
// since we no longer know what header is safe to use
if (tmpActive != currently active header pointer)
{
    if (tmpActive == tmpA)
        Atomically increment tmpB->read lock count
    else
        Atomically increment tmpA->read lock count
    // A new writer may no longer swap headers because we have both locked
    // However, an existing writer may be editing the edit header
    // If he swaps before we read the active pointer again, that's OK,
    // since we know that another writer cannot start editing yet
    tmpActive = pointer to currently active header
    if (tmpActive == tmpA)
        Atomically decrement tmpB->read lock count
    else
        Atomically decrement tmpA->read lock count
}
Use tmpActive to read data as requested by the caller
Unlock by atomically decrementing tmpActive->Read lock count
```

What is claimed is:

1. A real-time memory device comprising:
   a first field header comprising a first buffer, wherein the first field header is in an edit state such that it is configured to have data values written thereto by a single writer thread;
   a second field header comprising a second buffer, wherein the second field header includes a pointer to a current real-time data value corresponding to a process device within a continuous process, and wherein the second field header is in an active state such that it is configured to have the current real-time data values read therefrom by one or more reader threads; and
   a record header comprising:
      a first field pointer pointing to the first field header,
      a second field pointer pointing to the second field header, and
      a currently active pointer pointing to the second field pointer when the second field header is in the active state.

2. The real-time memory device of claim 1, wherein the record header further comprises a write lock word data value to prevent more than one writer thread from writing data values to the first field header at a particular time.

3. The real-time memory device of claim 1, wherein the first field header further comprises a read lock count data value and a number of fields data value, and wherein the second field header further comprises a read lock count data value and a number of fields data value.

4. The real-time memory device of claim 1, wherein the first field header further comprises a pointer to a number of fields data value and a pointer to a pointer to a data value, and wherein the second field header further comprises a pointer to a number of fields data value and a pointer to a pointer to a data value.

5. The real-time memory device of claim 1, wherein the single writer thread writes the data values to the first field header and the reader threads read the current real-time data values from the second field header substantially simultaneously.

6. A computer-implemented method comprising:
   locking a first field header, the first field header being in an active state and comprising a database record corresponding to a process device within a continuous process;
   identifying an active field header, wherein the active field header comprises one of the first field header and a second field header being in the active state, the second field header further comprising the database record, wherein the other of the first field header and the second field header comprises an edit field header, and wherein the active field header and the edit field header comprise a double buffer of the database record;
   locking the second field header when the second field header is the active record header;
   unlocking the first field header when the second field header is the active record header; and
   reading a pointer value from a data field of the active field header.

7. The method of claim 6, further comprising editing, by a writer, one or more values of the edit field header.

8. The method of claim 7 wherein said editing is substantially simultaneous with said reading.

9. The method of claim 6, further comprising reading at least one data value from a memory location represented by the pointer value.

10. The method of claim 9, further comprising unlocking the active field header to enable editing one or more values thereof by a writer.

11. A method comprising:
   obtaining a write lock of a database record corresponding to a process device within a continuous process;
   reading a first pointer to a first field header comprising the database record and a second pointer to a second field header comprising the database record;
   identifying which of the first pointer and the second pointer is an active pointer, wherein the active pointer points to one of the first field header and the second field header in an active state;
   identifying which of the first pointer and the second pointer is an edit pointer, wherein the edit pointer points to the other of the first field header and the second field header in an edit state;
   copying data values in fields comprising the active field header into fields comprising the edit field header in response to the edit field header being unlocked; and
   modifying the data values in the fields comprising the edit field header, wherein the modified data values correspond to configuration values of the process device.

12. The method of claim 11, wherein said copying comprises shallow copying.

13. The method of claim 11, wherein the edit field header being unlocked comprises a read lock count data value of the edit field header being equal to zero.

14. The method of claim 11, further comprising releasing the write lock.

15. The method of claim 11, further comprising swapping the active field header and the edit field header upon said releasing.

16. The method of claim 15, further comprising:
   unlocking the database record to enable modification of one or more values thereof by a writer; and
   returning a success indicia for the unlock call.

17. The method of claim 11, further comprising spinlocking said method until the edit field header is unlocked.

18. The method of claim 11, further comprising reading the data values in the fields comprising the active field header substantially simultaneously with said modifying.

* * * * *